United States Patent [19]

Lindner et al.

[11] Patent Number: 5,715,920
[45] Date of Patent: Feb. 10, 1998

[54] FRICTION CLUTCH WITH AUXILIARY SPRING TO ASSIST THE RELEASE FORCE

[75] Inventors: Joachim Lindner, Schweinfurt; Günther Esly, Wasserlosen; Michael Weiss, Dittelbrunn; Heiko Schulz-Andres, Poppenhausen; Achim Link, Schweinfurt; Reinhold Weidinger, Unterspiesheim, all of Germany

[73] Assignee: Fichtel & Sachs AG, Schweinfurt, Germany

[21] Appl. No.: 577,465

[22] Filed: Dec. 21, 1995

[30] Foreign Application Priority Data

Dec. 24, 1994 [DE] Germany .................. 44 46 755.9
May 17, 1995 [DE] Germany .................. 19 51 8055.0

[51] Int. Cl.$^6$ .................. F16D 13/71; F16D 13/75
[52] U.S. Cl. .................. 192/70.25; 192/89.23; 192/111 A; 192/70.27
[58] Field of Search .................. 192/70.25, 70.27, 192/89.23, 109 A, 111 A

[56] References Cited

U.S. PATENT DOCUMENTS

| | | | |
|---|---|---|---|
| 4,207,972 | 6/1980 | Zeidler | 192/111 A |
| 4,602,708 | 7/1986 | Nagano | 192/70.27 |
| 4,949,829 | 8/1990 | Tojima et al. | 192/89.23 |
| 5,088,583 | 2/1992 | Takeuchi et al. | 192/70.27 |
| 5,148,904 | 9/1992 | Takashi et al. | 192/70.27 X |
| 5,238,093 | 8/1993 | Campbell . | |
| 5,400,887 | 3/1995 | Mizukami et al. | 192/89.23 |
| 5,409,091 | 4/1995 | Reik et al. | 192/70.25 |

FOREIGN PATENT DOCUMENTS

| | | |
|---|---|---|
| 0944050 | 6/1956 | Germany . |
| 3991022 | 8/1990 | Germany . |
| 2287994 | 10/1995 | United Kingdom . |

Primary Examiner—Richard M. Lorence
Attorney, Agent, or Firm—Nils H. Ljungman and Associates

[57] ABSTRACT

This invention relates to a friction clutch with a membrane spring in a pulled or pushed clutch design, in which there is a second membrane spring/plate spring which provides assistance to the release force and which, when the friction clutch is engaged, generates little or no release force, and generates an increasing release force as the release travel increases.

21 Claims, 7 Drawing Sheets

FRICTION CLUTCH WITH AUXILIARY SPRING TO ASSIST THE RELEASE FORCE

BACKGROUND OF THE INVENTION

1. Field of the Invention

The present invention relates to a friction clutch in the drive train of a motor vehicle, such a clutch comprising:

- a clutch housing which is fastened to a flywheel of an internal combustion engine and can rotate with the flywheel around an axis of rotation,
- an application plate which is fastened in the clutch housing non-rotationally but also fastened so that it can be displaced axially,
- a clutch disc with friction linings between the application plate and the flywheel,
- a membrane spring which is supported on one side on the application plate and on the other side on the clutch housing, and which membrane spring applies pressure to the application plate toward the flywheel to generate an application force A,
- a release element of a release system which acts on the radially inner areas of the membrane spring.

2. Background Information

German Patent 39 91 022 discloses a known membrane spring clutch which is provided with an additional spring element that makes an adjustment as the wear to the friction linings increases. The additional spring element opposes the spring force of the membrane spring. In this manner, when the friction linings of the clutch become worn, the increase of the spring force which is typical of a membrane clutch can be controlled so that the application force which is originated by the membrane spring remains essentially constant. This measure is usually incapable of reducing the actuation forces; it only usually ensures that the release forces do not increase.

German Patent 944 050 discloses a clutch actuation system in which an auxiliary spring can be used as a top dead center spring, via several intermediate levers and linkage points, so that there is a reduction of the actuation force as the actuation travel of the clutch pedal increases. This construction is quite complex and expensive, from the point of view of both manufacture and installation.

OBJECT OF THE INVENTION

An object of the present invention is to use the simplest possible means to reduce the actuation force in a membrane spring clutch.

SUMMARY OF THE INVENTION

The present invention teaches that this object can be accomplished, in accordance with at least one preferred embodiment, by means of the features disclosed herebelow.

As a result of a device for the automatic adjustment to compensate for wear to the friction linings, on one hand, the installed position of the membrane spring and thus the application force produced by it can be preserved, and, on the other hand, as a result of the presence of a membrane spring/plate spring, which is supported, on one side, on a fixed or axially fixed component and, on the other side, on another component in the actuation system consisting of the application plate and release system, and which, when the friction clutch is engaged, exerts little or no release force, but which force increases with increasing release travel, the invention teaches that it is possible to achieve an optimal correspondence between the characteristic of the membrane spring/plate spring and the characteristic of the membrane spring, so that an effective reduction of the actuation force in the range of release travel becomes possible. Thus the membrane spring/plate spring can be located at any point in the overall actuation mechanism.

In one advantageous configuration of the invention, the membrane spring/plate spring is provided with tabs or fingers which point radially inward from the spring body, and which are supported on the outside of the flexible tabs of the membrane spring, whereby the spring body is supported in the vicinity of its outside diameter on the clutch housing. As a result of this configuration and this arrangement of the membrane spring/plate spring, it is possible to install the system easily and to achieve a correct balancing of the spring forces.

To secure the membrane spring/plate spring against snapping as a result of crossover, or zero crossing, when the friction clutch is engaged, the invention teaches that the membrane spring/plate spring can be provided with individual tabs which run radially outward from the spring body and which are in contact with the membrane spring. The membrane spring/plate spring is thereby held in permanent contact with the membrane spring by simple means and cannot lift up from the membrane spring (for example, on account of fluctuations in tolerances) when the clutch is engaged.

If, to fix the membrane spring in place radially, there are several spacer bolts located concentric to the axis of rotation in the clutch housing, the membrane spring/plate spring can also be fixed in place by means of the spacer bolts in the vicinity of its outside diameter, namely both in the radial and in the axial direction, whereby, to provide an anchoring between the membrane spring/plate spring and the flexible tabs of the membrane spring, the invention teaches that the membrane spring/plate spring can have one or more lugs located on the periphery between two neighboring tabs, which lugs are hooked into graduated openings of the corresponding flexible tabs of the membrane spring. In this manner, the membrane spring/plate spring can be fixed in its position with respect to the flexible tabs of the membrane spring without the need for additional components.

The openings in the flexible tabs of the membrane spring can thereby be realized in the form of widened portions of the slots between each two flexible tabs.

The two springs can easily be assembled by bringing one or both of the two springs into the assembly position by elastic, conical deformation, and by interlocking the two springs to one another in their installed position following assembly.

In a friction clutch in which the membrane spring is fixed in place by several spacer bolts located concentric to the axis of rotation in the clutch housing, the invention teaches that at least some of the individual flexible tabs of the membrane spring/plate spring can be held in contact with the flexible tabs of the membrane spring by separate components. The separate components in question can be the release bearing of the release system, whereby some or all of the tabs of the membrane spring/plate spring extend radially inward far enough that they reach axially between the flexible tabs of the membrane spring and the release bearing. In this manner, the release bearing, which is already present in any case, can be used to fix the membrane spring/plate spring in place.

But it is also possible, without any additional measures, to rivet individual tabs of the membrane spring/plate spring to corresponding flexible tabs of the membrane spring. Such a configuration can be adapted to meet the requirements of different applications, since the rivets can be installed in the most suitable position or positions.

But it is also possible to realize the separate component in the shape of a ring and to orient it concentrically with respect to the axis of rotation so that it holds the tabs in contact with the flexible tabs of the membrane spring.

In one possible embodiment, the component body of the ring-shaped component is located on the side of the tabs facing away from the flexible tabs, and extends by means of axial arms through the slots between the flexible tabs, whereby the arms are bent or hammered down on the back side. In this construction, all the flexible tabs can be fixed in place with one component.

But it is also possible to design the component body as an axially flexible corrugated washer which is in contact with flexible tabs on the side of the flexible tabs facing away from the membrane spring/plate spring, and which extends by means of axially-directed arms through the slots between the flexible tabs of the membrane spring, and which surrounds some or all of the tabs of the membrane spring/plate spring with brackets bent radially outward, whereby the tabs of the membrane spring/plate spring are arranged so that they cover or overlap, the slots peripherally. In such a construction, the axially flexible effect of the corrugated washer ensures that relative movements between the tabs and the flexible tabs can be absorbed.

BRIEF DESCRIPTION OF THE DRAWINGS

The invention is explained in greater detail below with reference to the several embodiments illustrated in the accompanying drawings.

DESCRIPTION OF THE PREFERRED EMBODIMENT

Figure 1A:
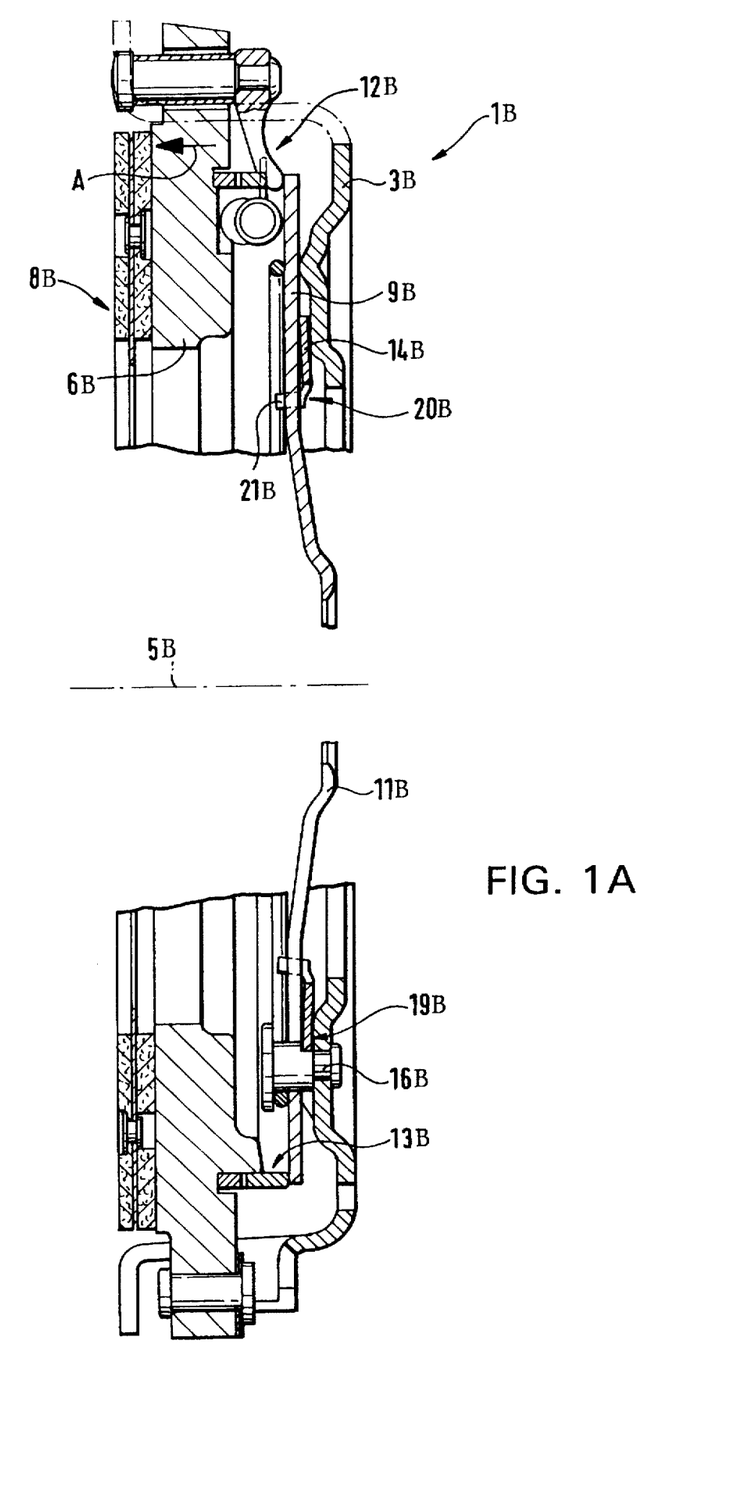
FIG. 1A is a longitudinal section through a friction clutch.

FIG. 1A shows a friction clutch 1B, the basic design of which is conventional. For example, a clutch housing 3B is firmly fastened to a flywheel (not shown) of an internal combustion engine, and can rotate with the flywheel around the axis of rotation 5B. Inside the clutch housing 3B, a membrane spring 9B is supported. When the clutch is engaged, membrane spring 9B exerts an application force A on the application plate 6B, so that the clutch disc 8B, with its friction linings, is clamped between the flywheel and the application plate 6B with the application force A. The application plate 6B is thereby fastened, in a manner not shown, non-rotationally with respect to the clutch housing 3B, but so that it can be displaced axially with respect to the clutch housing 3B.

The friction clutch 1B is preferably realized in the form of a pushed clutch, which means that the membrane spring 9B is supported in the vicinity of its outside circumference on the application plate 6B, and in the vicinity of an intermediate diameter, is supported by means of a multiplicity of spacer bolts 16B distributed about the periphery of the clutch housing 3B. Toward the radial inside, the membrane spring 9B can be provided with a multiplicity of flexible tabs 11B distributed on the periphery, with which a release system (not shown) is engaged.

Between the outside diameter area of the membrane spring 9B and the application plate 6B, there is preferably a device 12B to automatically compensate for wear to the friction linings. Device 12B can include, among other things, adjustment elements 13B which, when the friction linings of the clutch disc 8B become worn, ensure that, in spite of the displacement of the application plate 6B in the direction indicated by the arrow A when wear occurs, the distance between the application plate and the radially outer area of the membrane spring 9B is increased as a function of the wear, so that the membrane spring 9B can exert a uniform application force A on the application plate 6B over the entire life of the friction linings of the clutch disc 8B. A more detailed description of the device 12B would not appear to be warranted, since device 12B can exist in one of several different embodiments, such as the one disclosed in Unexamined German Patent Application 35 18 781.

Also preferably located in the friction clutch 1B is a membrane spring/plate spring 14B which, in a manner to be described in more detail, effects a reduction of the release force which must be applied. This membrane spring/plate spring 14B is preferably designed and installed so that, in the illustrated engaged position of the friction clutch 1B, it exerts little or no release force on the membrane spring 9B. As the release movement (i.e. a movement of the flexible tabs 11B of the membrane spring 9B in the direction indicated by the arrow A or a motion of the radially outer edge of the membrane spring 9B in the opposite direction) increases, the membrane spring/plate spring 14B can preferably exert an increasing release force on the membrane spring 9B, so that the actuation forces for the friction clutch 1B can be significantly reduced.

However, since there are natural divergences which occur inevitably when springs of this type are manufactured in large numbers, and since an objective is to keep the crossover of the spring characteristic as close as possible to the original installed position, it is possible that spring combinations may occur in which the crossover of the spring characteristic can be displaced toward greater spring travels. In such a case, when the friction clutch 1B is engaged, the membrane spring/plate spring 14B would snap and become ineffective.

To this end, as illustrated in FIG. 1A, the spring 14B is preferably located so that it cannot snap into its inactive position, since, in the vicinity of its radially outside and inside diameter, it is interlocked, on one hand, with the flexible tabs 11B of the membrane spring 9B, and, on the other hand, with the housing 3B. For this purpose, the spring 14B, in the vicinity of its outside diameter, can be supported on a recess 19B which is formed between the inside of the clutch housing 3B and a corresponding edge of the individual spacer bolts 16B. The recess 19B essentially corresponds to the thickness of the material of the spring 14B. In the inside diameter of the spring 14B, the spring, as a result of its internal stress, is normally in contact, by means of an encircling support area 20B, with the outside of the flexible tabs 11B. Further, there are preferably individual support elements 21B which can be realized separately or in one piece with the spring. 14B, and which run through the gaps peripherally between two flexible tabs 11B. Each individual support element can surround a flexible tab. Thus, the spring 14B will essentially not be able to move into its inactive position, and during each release process, it will supply a release assistance force as a result of its increasing spring force.

Figure 2:
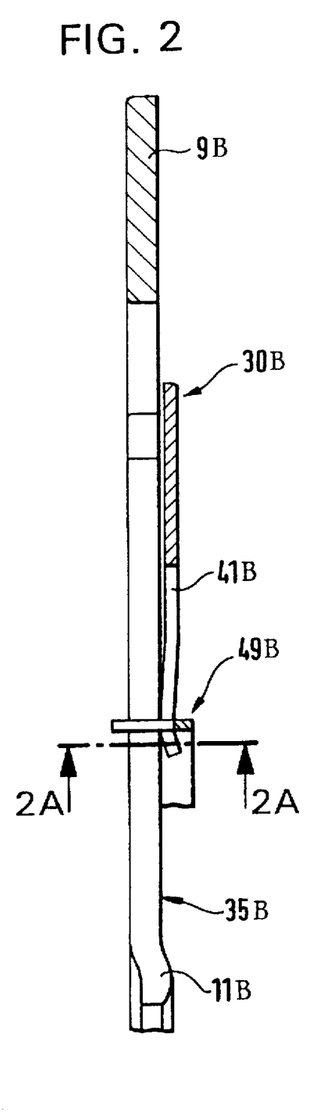
FIGS. 2, 2A, 3A, 4, 5 and 6 show variants of the spring which assists the release force.
Figure 2A:
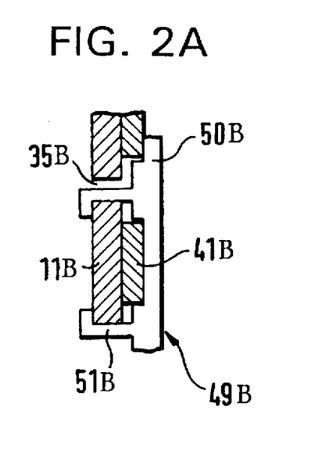

FIGS. 2 and 2A show a section through the membrane spring 9B with a membrane spring/plate spring 30B. In this case, the two springs are preferably connected to one another in the vicinity of the tabs 41B of the spring 30B by means of a separate component. The ring-shaped component 49B, which can be manufactured from a strip of sheet metal for example, is preferably oriented concentrically to the axis of rotation, is in contact with the tabs 41B on the side of the spring 30B facing away from the flexible tabs 11B of the membrane spring 9B, and is engaged by means of arms 51B which run axially through slots 35B, and is bent or hammered down on the back side of the flexible tabs 11B. As shown in Section 2A—2A, the flexible tabs 11b and the tabs 41B can be held in axial contact with one another by means of this ring-shaped component 49B. The component body 50B of the ring-shaped component 49B can be punched from a continuous strip of sheet metal and can then be bent into a ring.

Figure 3A:
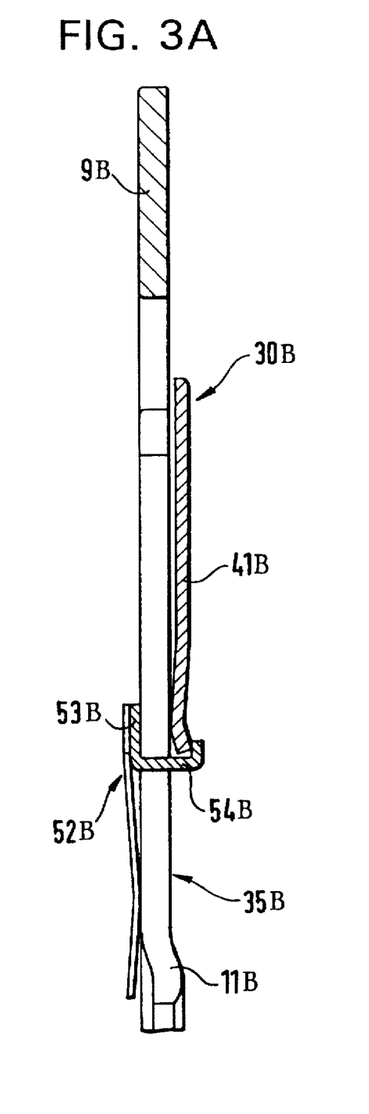

A variant of the embodiment illustrated in FIGS. 2 and 2A is illustrated in FIG. 3A. In FIG. 3A, a ring-shaped component 52B similar to a zig-zag spring, or no-sag spring or corrugated spring washer, is provided, the component body 53B of which preferably consists essentially of a ring which runs concentric to the axis of rotation and which has axial spring characteristics as a result of the peaks and troughs of the corrugations. Preferably extending from the periphery of the component body 53B are several arms 54B which are guided axially through the slots 35B of the flexible tabs 11B and are bent radially outward on the side facing the membrane spring/plate spring 30B. These bent ends preferably hold the tabs 41B of the spring 30B in their position relative to the membrane spring 9B, whereby the tabs 41B are realized and oriented so that they each cover or overlap the periphery of a slot 35B between the flexible tabs 11B. As a result of the spring characteristic of the ring-shaped component 52B, relative movements are possible between the flexible tabs 11B and the tabs 41B.

Figure 4:
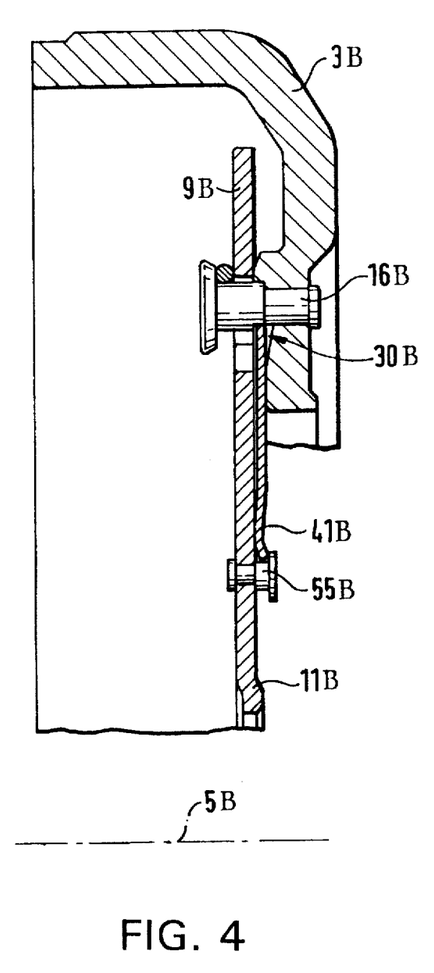

As shown in FIG. 4, the tabs 41B of the spring 30B can also be fixed in place by means of rivets 45B which are introduced into the flexible tabs 11b of the membrane spring 9B. In this case, not all of the flexible tabs 11B need to be provided with a rivet 55B; it is sufficient to introduce rivets 55B only into some of the flexible tabs 11B.

Figure 5:
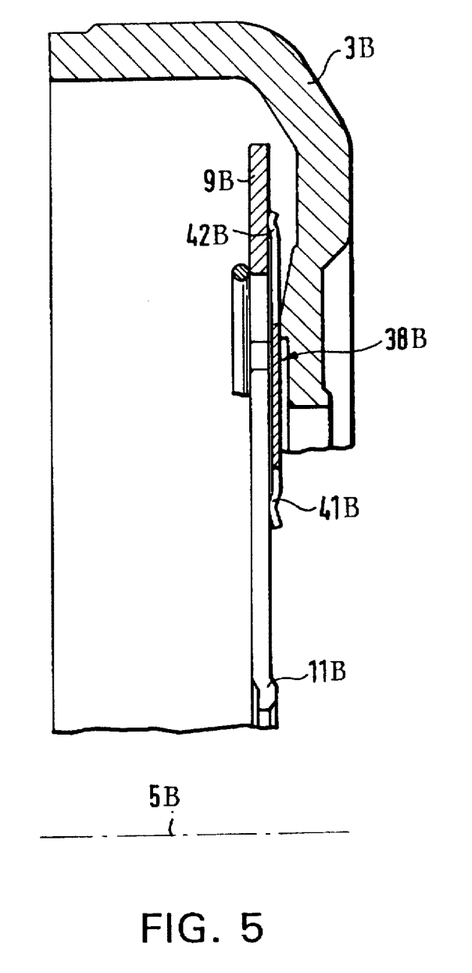

As shown in FIG. 5, the membrane spring/plate spring 38B, in addition to the tabs 41B which point radially inward, can be provided with one or more tabs 42B which extend radially outward and are in contact with the spring body of the membrane spring 9B. In this manner, too, the spring 38B can be held in continuous contact with the membrane spring 9B, and in particular without additional components and over the entire pivoting range of the membrane spring 9B.

Figure 6:
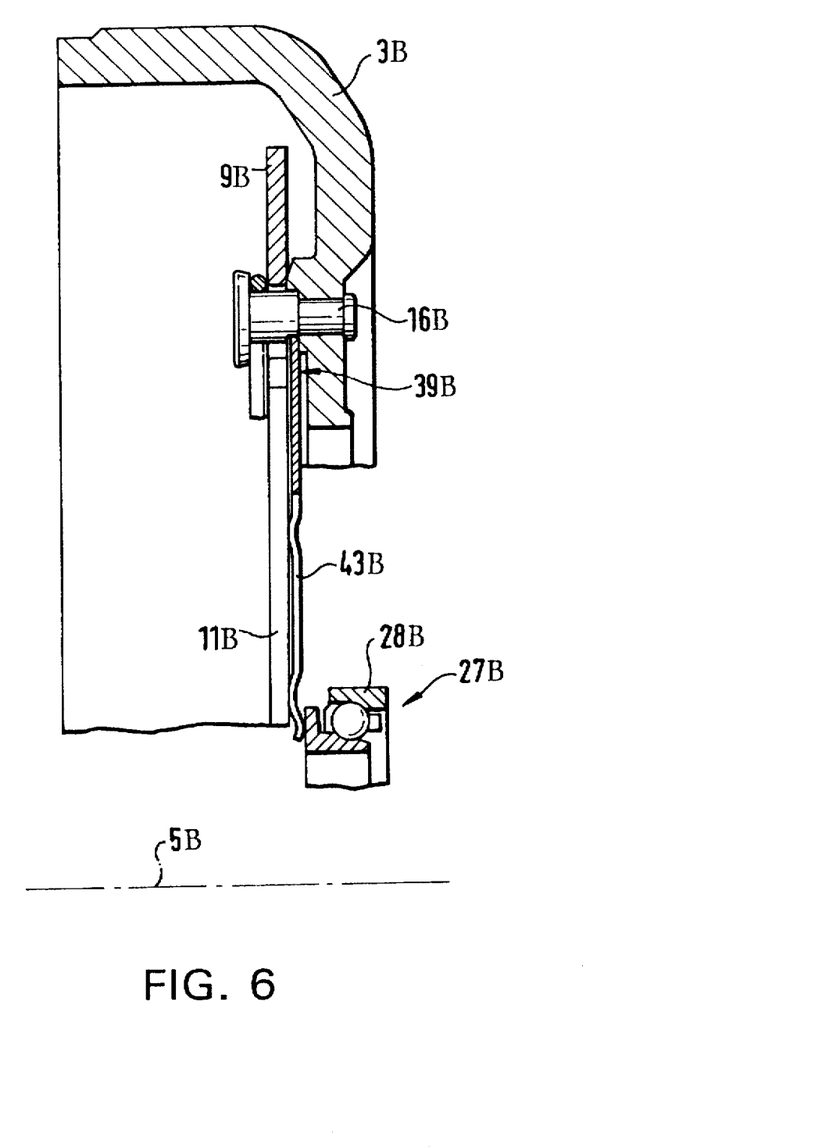

In FIG. 6, a component which is already present is used to hold the membrane spring/plate spring 39B in its position relative to the membrane spring 9B. The tabs 43B which extend radially inward from the spring body of the spring 39B are thereby provided with extensions, such that these extensions reach between the flexible tabs 11B of the membrane spring 9B and the release bearing 28B of the release system 27B. In this manner, the spring 39B is likewise fixed in its position relative to the membrane spring 9B under all operating conditions.

One feature of the invention resides broadly in the friction clutch 1B, 2B in the drive train of a motor vehicle, comprising a clutch housing 3B, 4B which is fastened to a flywheel of an internal combustion engine and which can rotate with the flywheel around an axis of rotation 5B, an application plate 6B, 7B which is fastened in the clutch housing 3B, 4B non-rotationally but also fastened so that it can be displaced axially, a clutch disc 8B with friction linings between the application plate 6B, 7B and the flywheel, a membrane spring 9B, 10B which is supported, on one hand, on the application plate 6B, 7B and, on the other hand, on the clutch housing 3B, 4B, and which membrane spring applies pressure to the application plate 6B, 7B toward the flywheel to generate an application force A, a release element of a release system which acts on the radially inner areas of the membrane spring 9B, 10B, a device 12B which makes an automatic adjustment to compensate for wear to the friction linings, to preserve the original installed position of the membrane spring 9B, 10B and the application force A, a membrane spring/plate spring 14B, 30B, 38B–39B which is supported on one side on a fixed or axially-fixed component 3B, 4B, and supported on the other side on another component 9B, 10B in the actuation system consisting of the application plate and release system, this membrane spring/plate spring 14B, 30B, 38B–39B exerting little or no release force when the friction clutch is engaged, and exerting an increasing release force as the release travel increases.

Another feature of the invention resides broadly in the friction clutch characterized by the fact that the membrane spring/plate spring 30B, 36B–39B has a spring body 44B with flexible tabs or fingers 41B–43B pointing radially inward, whereby the spring body 44B is supported in the vicinity of its outside diameter on the clutch housing 3B and the tabs 41B–43B act on the outside of the flexible tabs lib pointing away from the application plate 7B.

Yet another feature of the invention resides broadly in the friction clutch characterized by the fact that the membrane spring/plate spring 38B has individual tabs 42B which point radially outward from the spring body 44B and are in contact with the membrane spring 9B.

Still another feature of the invention resides broadly in the friction clutch whereby the membrane spring is fixed in place by several spacer bolts located concentric to the axis of rotation in the clutch housing, characterized by the fact that the membrane spring/plate spring 36B, 37B is supported axially in the vicinity of its outside diameter between the clutch housing 3B and the spacer bolts 16B, and that there are several lugs 45B, 46B located peripherally between two neighboring tabs 41B, the lugs being 45B, 46B hooked into graduated openings 47B, 48B of the corresponding flexible tabs 11B of the membrane spring 9B.

A further feature of the invention resides broadly in the friction clutch characterized by the fact that the openings 47B, 48B are realized in the form of widened portions of the slots 35B between each two flexible tabs 11B.

Another feature of the invention resides broadly in the friction clutch characterized by the fact that the connection of the membrane spring/plate spring 36B, 37B and the membrane spring 9B is realized by the elastic, conical deformation of one or both springs 36B, 37B; 9B and, as a result of the interlocking connection, the membrane spring/plate spring 36B, 37B and the membrane spring 9B cannot be separated once in the installed or assembled position.

Yet another feature of the invention resides broadly in the friction clutch whereby the membrane spring is fixed in place by several spacer bolts located concentric to the axis of rotation on the clutch housing, characterized by the fact that at least individual tabs 41B, 43B of the membrane spring/plate spring 30B, 39B are held in contact with the flexible tabs 11B of the membrane spring 9B by separate components 28B, 49B, 52B.

Still another feature of the invention resides broadly in the friction clutch characterized by the fact that some or all of the tabs 43B are extended radially inwardly far enough that they are clamped axially between the flexible tabs 11B of the membrane spring 9B and the release bearing 28 of the release system 27B.

A further feature of the invention resides broadly in the friction clutch characterized by the fact that at least some of the tabs 41B of the membrane spring/plate spring 30B are riveted to the corresponding flexible tabs 11B of the membrane spring 9B.

Another feature of the invention resides broadly in the friction clutch characterized by the fact that a ring-shaped component 29B, 52B is engaged concentric to the axis of rotation 5B with flexible tabs 11B of the membrane spring 9B and holds the tabs 41B in contact or in position.

Yet another feature of the invention resides broadly in the friction clutch characterized by the fact that the component body 53B of the ring-shaped component 49B is in contact on the side of the tabs 41B facing away from the flexible tabs 11B, that the component body 53B runs through the slots 35B between the flexible tabs 11B with arms 51B which run axially, and that the arms 51B are bent or hammered down, or peened on their back side.

Still another feature of the invention resides broadly in the friction clutch characterized by the fact that the component body 53B is realized in the form of an axially flexible corrugated washer being in contact with the flexible tabs 11B on the side of the flexible tabs 11b facing away from the membrane spring/plate spring 30B, and that, starting from the corrugated washer, axially-oriented arms 54B run through the slots 35B between the flexible tabs 11B, and, in brackets angled radially outward, surround one or more tabs 41B of the membrane spring/plate spring 30B, which tabs 41B are arranged so that they cover or overlap the periphery of the slots 35B.

Figure 1B:
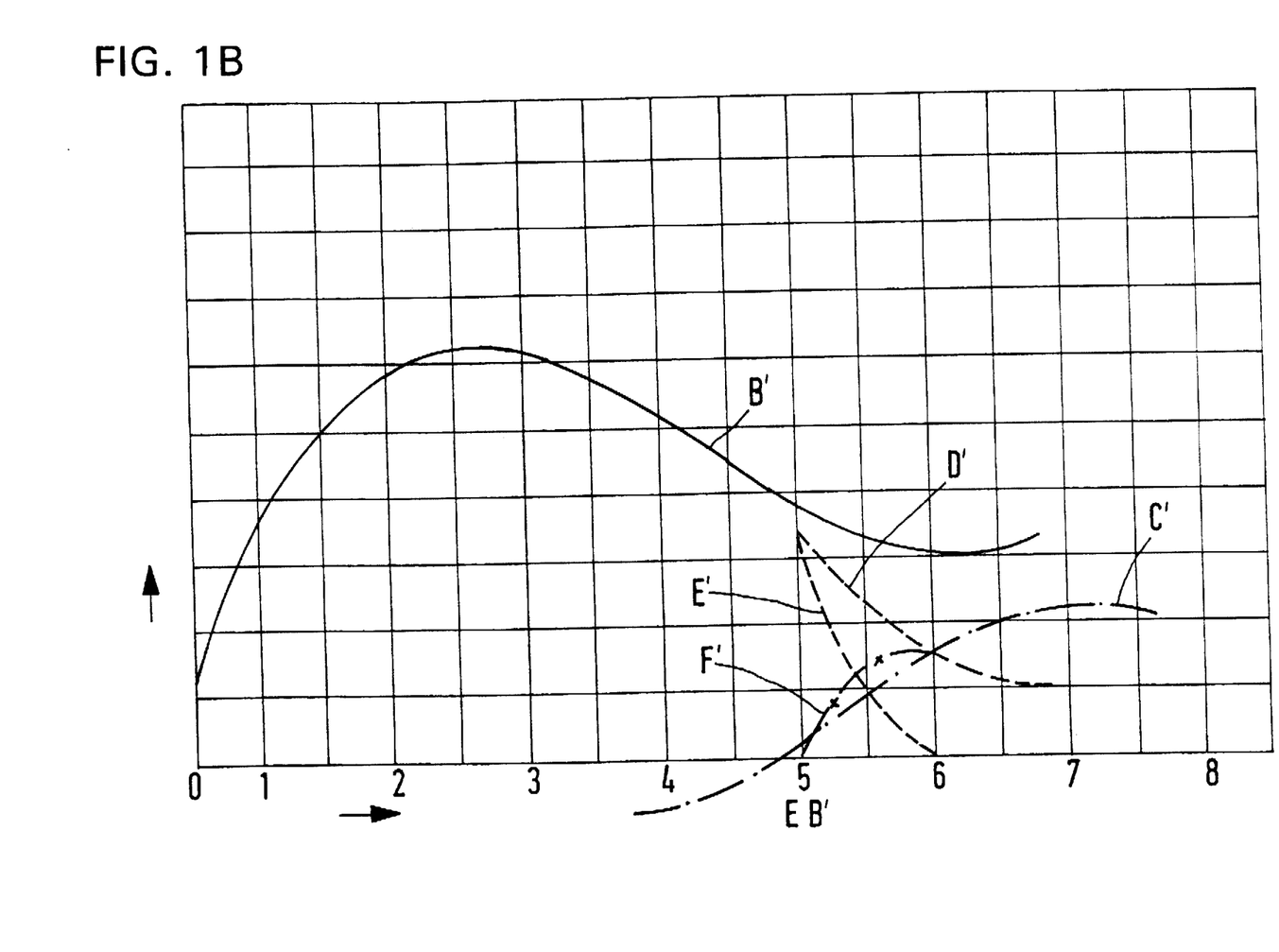
FIG. 1B shows the spring forces of the various components plotted over the spring travel.

FIG. 1B shows several spring characteristics plotted as a function of the spring travel. The characteristic B' corresponds to the membrane spring 9A, and shows the spring force over the spring travel. This is a typical membrane spring characteristic with an increase in the spring force in the range of small spring travel, and a decrease in the spring force with increasing spring travel. EB' indicates the original installed position of the membrane spring in the friction clutch under operating conditions with an engaged clutch. This installed position is kept constant by the device 12A.

The installed position is preferably selected so that the application force generated here by the membrane spring 9A produces the specified clamping force for the clutch disc, and to transmit the specified torque. The release movement essentially takes place from the installed position in the direction of increased spring travel.

In FIG. 1B, it can be assumed that the release movement takes place between the number 5 and approximately 6, 7. In this region, the spring characteristic B' has already reached its minimum and then ascends slightly. The membrane spring/plate spring 14A which is designed to reduce the release force produces a spring characteristic C'. Spring characteristic C' can basically be identical to the path of the characteristic B', but can run in the opposite direction, and the spring 14A is preferably installed so that in the installed position, little or no release force is exerted on the membrane spring 9A. With increasing release motion, the force increases sharply as shown by spring characteristic C', and the actuation force to be applied by the release system to the flexible tabs 11A is reduced by the same amount. By subtraction of the characteristic C' from the characteristic B', the characteristic D' is achieved, which represents the force to be applied by the release system.

It should also be taken into consideration that elasticities may also provide some assistance. Such elasticities could be constituted, for example, by a clutch housing 3A which is not absolutely rigid and/or by some flexibility between the friction linings of the clutch disc 8A. For example, the spring characteristic E' can take into consideration the effect of the flexibility of the lining of the clutch disc 8A, which represents an opposing force to the spring characteristic B', and can thus be subtracted from the spring characteristic D' in the vicinity of its action between the installed position and the number 6, thereby producing the spring characteristic F'. This spring characteristic D' can be the actual release force to be applied by the release system or by the driver. The spring characteristic F', approximately in the vicinity of the number 6 of the spring travel, can make a transition into the spring characteristic D', and then run further downward with the latter.

It is clear that there is essentially a major difference between the spring characteristic D' of the membrane spring 9A and the spring characteristic F' which must be applied to release the friction clutch.

The friction clutch realized as shown in FIGS. 1A and 1B can be actuated with very low forces. In this regard, it should be noted that the balancing, or coordination, of the installed position of the membrane spring/plate spring 14A is preferably carried out in such a manner that, in the installed position, the membrane or plate spring 14A exerts the smallest possible release force, so that at this operating point, only a small load is applied to the membrane spring 9A. That is also shown in FIG. 1B, where the spring characteristics E' and D' begin somewhat below the spring characteristic B', and namely by the same amount by which, in this installed position E', B', the spring characteristic C' runs above the zero line of the spring force.

Figure 2B:
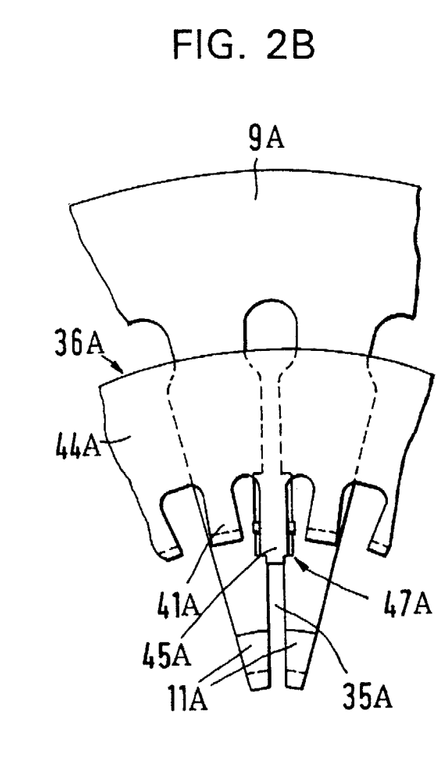
FIGS. 2B, 2C, 2D and 3B, 3C, 3D are partial sections through the upper half of the friction clutch with variant springs.
Figure 2C:
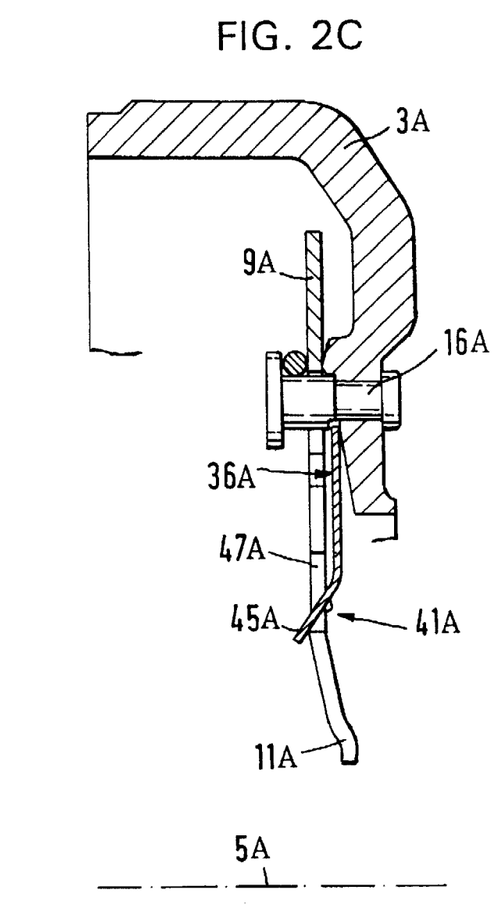
Figure 2D:
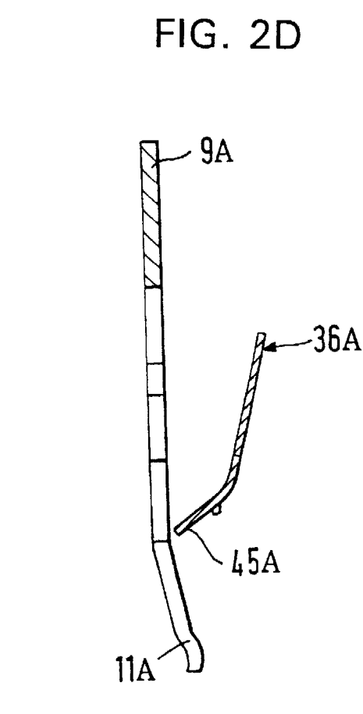

FIG. 2C, shows a section through the upper half of a friction clutch with the clutch housing 3A, membrane spring 9A and spacer bolts 16A which keep the membrane spring 9A fixed in place. The membrane spring/plate spring 36A is shown as being located between the flexible tabs 11A of the membrane spring 9A which point radially outward and the clutch housing 3A. By means of the outside diameter of its spring body 44A, the membrane spring/plate spring 36A is held in place axially and radially on the clutch housing 3A and on the spacer bolt 16A. It extends by means of its spring body radially inward, where it makes a transition into the tabs 41A, which in the operating position as shown in the drawing are in contact with the outside of the flexible tabs 11A of the membrane spring 9A. FIG. 2B shows details of the membrane spring 9A, viewed from the membrane spring 36A. The spring 36A, on the periphery between each two tabs 41A, has one or more lugs 45A which extend through respective slots 35A between two flexible tabs 11A of the membrane spring next to one another on the periphery, and are hooked into the slots. For this purpose, the corresponding flexible tabs 11A are provided with a graduated opening 47A. The peripheral length of the lugs 45A is thereby coordinated with the dimensions of the opening 47A, and when installed, the lugs surround the steps between the openings 47A and the slot 35A. The spring 36A and the membrane spring 9A are installed as shown in FIG. 2D, whereby one of the two springs, or both of them, are brought into a conical position (e.g. a relaxed position), at which time the lugs 45A are threaded into the openings 47A. When assembled, there is thus a positive interlock between the two springs, so that when the friction clutch is engaged, the spring 36A cannot inadvertently snap into its inactive position.

Figure 3B:
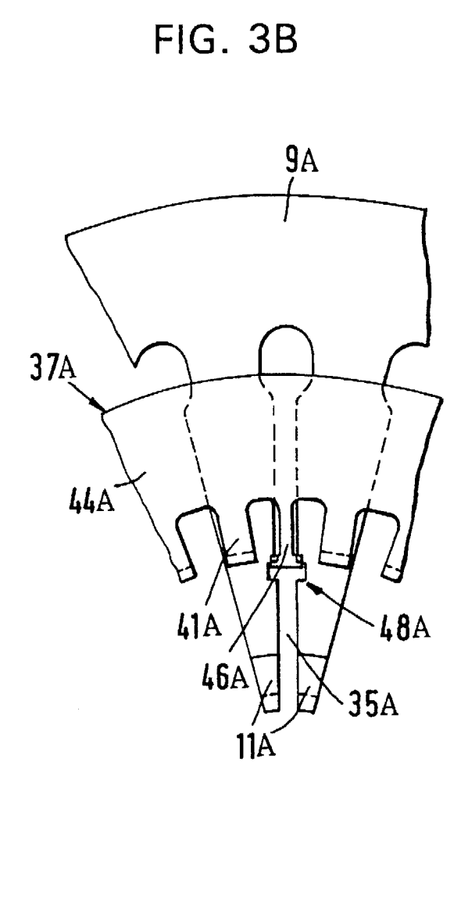
Figure 3C:
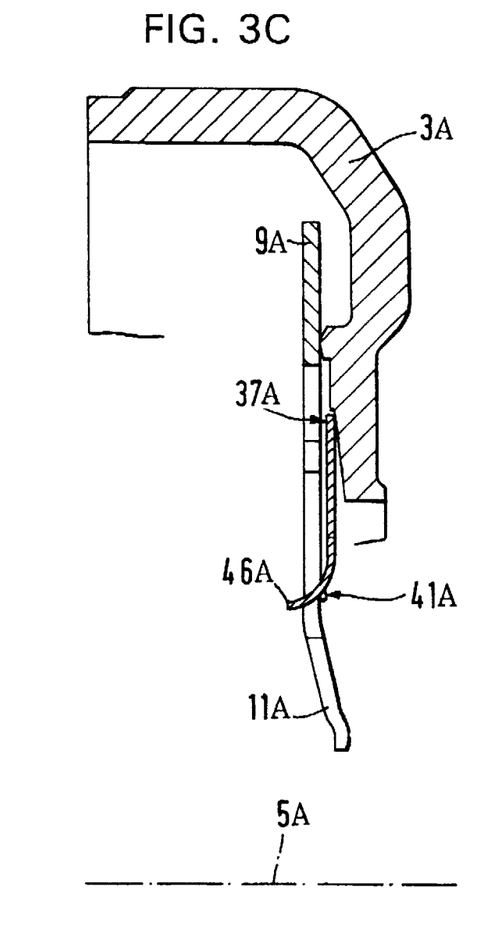
Figure 3D:
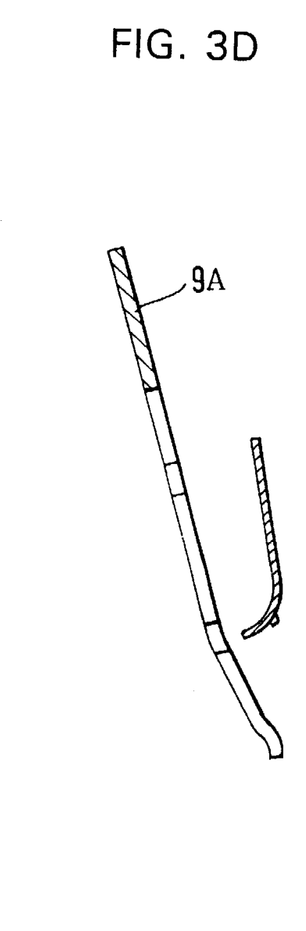

FIGS. 3B, 3C and 3D illustrate a variant embodiment of the invention from the same perspective. The membrane spring/plate spring 37A is shown as being installed with its spring body 44A and the tabs 41A pointing radially inward between the membrane spring 9A and the clutch housing 3A, and is fixed in position by means of the spacer bolts (not shown here). In contrast to FIG. 2B, 2C and 2D, the openings 48A in the flexible tabs of the membrane spring 9A are provided with a slight widening in the radial direction, and the terminal areas of the lugs 46A are coordinated with the openings 48A, while the connection area of the spring body 44A is coordinated with the slot 35A between two flexible tabs 11A which are next to one another on the periphery. It thereby becomes possible during assembly and installation to introduce the lugs 46A through the openings 48A, and then, when the clutch is in the operating position, they can be displaced radially outward far enough so that they are hooked behind the slot 35A radially outside the opening 48A. The function of this system corresponds to that of the system illustrated in FIG. 2B, 2C and 2C.

Some examples of control devices and other systems which might be used with or in the present invention are:

U.S. Pat. No. 4,852,419, Inventors: Friedrich Kittel, Dieter Lutz, Franz Nagler, Horst Oppitz and Gerhard Gasper, Title: Control device, in particular for a motor-vehicle friction clutch; U.S. Pat. No. 5,212,380, Inventors: Seiichi Sato, Kazuo Yamaguchi, Yoshi Kurosawa, Atsushi Ueda and Masami Matsumura, Title: Automotive engine control system with rotary encoder indexing; U.S. Pat. No. 5,326,160, Inventors: John P. Bayliss and Sean Byrnes, Title: Hydraulic systems for vehicles; U.S. Pat. No. 5,307,013, Inventors: Alfred J. Santos and Michael C. Brauer, Title: Digital position sensor system for detecting automatic transmission gear modes.

Some examples of hydraulic master cylinders which may be utilized in accordance with the present invention may be found in the following U.S. Pat. No. 5,211,099 entitled "Slave Cylinder for a Hydraulic Actuating System of a Motor Vehicle Friction Clutch" to Fichtel & Sachs; U.S. Pat. No. 5,213,187 entitled "Device Relating to a Semiautomatic Clutch for Vehicles"; U.S. Pat. No. 5,284,017 entitled "Hydraulic Master Cylinder" to Automotive Products; and U.S. Pat. No. 5,301,597 entitled "Hydraulic Cylinder" to Kugelfischer Schafer.

Some examples of clutch assemblies and various components associated therewith which could possibly utilize the present invention may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application Nos. P 195 8 055.0, filed on May 17, 1995, and P 44 46 755.9, filed on Dec. 24, 1994, having inventors Joachim Lindner, Günther Esly, Michael Weiss, Heiko Schulz-Andres, Achim Link, and Reinhold Weidinger, and DE-OS P 195 18 055.0 and P 44 46 755.9 and DE-PS P 195 18 055.0 and P 44 46 755.9, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:
   a clutch housing;
   a clutch disc disposed within said housing;
   a pressure plate for engaging and disengaging said clutch disc with a flywheel of an internal combustion engine;
   an actuation system comprising means for biasing said pressure plate;
   said actuation system comprising a membrane spring;
   said clutch disc comprising friction linings;
   said friction linings being disposed between said pressure plate and the flywheel of an internal combustion engine;
   means for making an automatic adjustment to compensate for wear to said friction linings;
   a substantially disc-shaped spring having a first side and a second side disposed opposite one another;
   said first side being disposed to abut said clutch housing;
   said second side being disposed to abut said membrane spring;
   said actuating system having a release travel distance during the disengaging of said friction clutch from the flywheel;
   said substantially disc-shaped spring providing means for providing a first release force upon the engagement of said friction clutch with the flywheel;
   said providing means providing a second release force, which second release force increases in magnitude as

11 the release travel distance of said actuation system increases during the disengagement of said friction clutch from the flywheel; the second release force being greater than the first release force;

said clutch disc defining an axis of rotation and an axial direction parallel to the axis of rotation;

said substantially disc-shaped spring comprising:
a body member being disposed substantially concentrically about said axis of rotation; and
a plurality of flexible tab portions extending radially inward from said body member;

said body member having an inside diameter and an outside diameter;

said body member being supported adjacent said outside diameter on said clutch housing;

said membrane spring comprising a plurality of flexible tab elements;

each of said flexible tab elements having a surface facing away from said pressure plate;

said flexible tab portions being disposed to contact said surfaces of said flexible tab elements; and said automatic adjustment means providing means for substantially maintaining the distance and biasing force between said pressure plate and said membrane spring.

2. The friction clutch according to claim 1, wherein:
said membrane spring has a first surface disposed facing said pressure plate;
said membrane spring has a second surface disposed opposite said first surface area;
said second surface comprises said surfaces of said flexible tab elements;
said substantially disc-shaped spring further comprises:
a plurality of additional flexible tab portions;
said additional flexible tab portions extending radially outward from said body member; and
said additional flexible tab portions are disposed so as to contact said second surface of said membrane spring.

3. The friction clutch according to claim 1, wherein:
said friction clutch further comprises:
a plurality of spacer bolts disposed substantially concentrically about said axis of rotation;
said substantially disc-shaped spring further comprises at least one lug;
said spacer bolts and said clutch housing together comprise means for axially supporting said disc-shaped spring adjacent said outside diameter of said substantially disc-shaped spring;
at least two adjacent ones of said flexible tab elements of said membrane spring define an opening therebetween; and
said at least one lug connects at least one of said flexible tab portions of said substantially disc-shaped spring with said opening.

4. The friction clutch according to claim 3, wherein:
said flexible tab elements of said membrane spring define elongated slots between adjacent ones of said flexible tab elements; and
at least one of said slots having a widened portion to form said opening.

5. The friction clutch according to claim 4, wherein:
at least one of said substantially disc-shaped spring and said membrane spring is elastically and conically deformed upon said at least one lug connecting at least

12 one of said flexible tab portions of said substantially disc-shaped spring with said opening; and
said substantially disc-shaped spring and said membrane spring are permanently connected to one another.

6. The friction clutch according to claim 1, further comprising:
a plurality of spacer bolts disposed substantially concentrically about said axis of rotation;
said spacer bolts connecting said clutch housing and said membrane spring; and
at least one separate connecting element holding at least one of said flexible tab portions of said disc-shaped spring in contact with said membrane spring.

7. Friction clutch as claimed in claim 6, wherein:
said actuation system comprises a release bearing;
said at least one separate connecting element comprises a release bearing;
said release bearing being disposed radially inward of said body member of said disc-shaped spring;
at least one of said flexible tab portions extending between said flexible tab elements of said membrane spring and said release bearing; and
said at least one of said flexible tab portions is firmly held in axial contact with said flexible tab elements of said membrane spring by said release bearing.

8. The friction clutch according to claim 6, wherein said at least one separate connecting element comprises at least one rivet.

9. The friction clutch according to claim 6, wherein said at least one separate connecting element comprises a ring-shaped component engaged concentric to the axis of rotation with said flexible tab elements of said membrane spring.

10. The friction clutch according to claim 9, wherein:
at least two adjacent ones of said flexible tab elements of said membrane spring define an opening therebetween;
said tab portions have a first surface facing said membrane spring and a second surface facing away from said membrane spring;
said ring-shaped component comprises a body member;
said body member being disposed to contact said second surface;
said ring-shaped component comprises a plurality of arm portions extending axially within and beyond said openings;
each of said arms comprising an end portion extending axially beyond said membrane spring;
said end portion being one of: bent and hammered down, toward said first surface.

11. The friction clutch according to claim 9, wherein:
at least two adjacent ones of said flexible tab elements of said membrane spring define an opening therebetween;
said flexible tab portions each have a first surface facing said membrane spring and a second surface facing away from said membrane spring;
said flexible tab portions extend so as to one of: cover and overlap said openings in said membrane spring;
said ring-shaped component comprises a body member;
said body member comprises an axially flexible corrugated washer;
said flexible tab elements each have a surface facing toward said pressure plate;
said body member being disposed to contact said surfaces of said flexible tab elements facing toward said pressure plate;

said ring-shaped component further comprises a plurality of arm portions extending axially outward from said body member into and beyond said openings; and said arm portions comprise end portions which extend radially outward on said first surface of said flexible tab portions to surround one or more of said flexible tab portions in one of: said cover and overlap areas.

12. A friction clutch for a motor vehicle, said friction clutch comprising:

a clutch housing;

a clutch disc disposed within said housing, said clutch disc defining an axis of rotation and an axial direction parallel to the axis of rotation;

a pressure plate for engaging and disengaging said clutch disc with a flywheel of an internal combustion engine;

said clutch housing being fixedly attached to the flywheel so as to allow simultaneous rotation of said clutch housing and the flywheel around the axis of rotation;

an actuation system comprising means for biasing said pressure plate;

said actuation system comprising a membrane spring;

said clutch disc comprising friction linings;

said friction linings being disposed between said pressure plate and the flywheel;

means for making an automatic adjustment to compensate for wear to said friction linings and for substantially maintaining the axial distance and biasing force between said pressure plate and said membrane spring;

a substantially disc-shaped spring having a first side and a second side disposed opposite one another;

said first side being supported by said clutch housing;

said second side being supported by said actuation system;

said actuation system having a release travel distance during the disengaging of said friction clutch;

said substantially disc-shaped spring providing means for providing a first release force upon the engagement of said friction clutch with the flywheel;

said providing means providing a second release force which increases in magnitude as the release travel distance of said actuation system increases during the disengagement of said friction clutch with the flywheel, said second release force being greater than said first release force;

said substantially disc-shaped spring comprising:

a body member being disposed substantially concentrically about said axis of rotation; and a plurality of flexible tab portions extending radially inward from said body member;

said body member having an inside diameter and an outside diameter;

said body member being supported adjacent said outside diameter on said clutch housing;

said membrane spring comprising a plurality of flexible tab elements;

each of said flexible tab elements having a surface facing away from said pressure plate; and said flexible tab portions being disposed to contact said surfaces of said flexible tab elements.

13. The friction clutch according to claim 12, wherein:

said membrane spring has a first surface facing said pressure plate;

said membrane spring has a second surface disposed opposite said first surface;

said second surface comprises said surfaces of said flexible tab elements;

said substantially disc-shaped spring further comprises: a plurality of additional flexible tab portions;

said additional flexible tab portions extending radially outward from said body member; and said additional flexible tab portions are disposed so as to contact said second surface of said membrane spring.

14. The friction clutch according to claim 12, wherein:

said friction clutch further comprises:

a plurality of spacer bolts disposed substantially concentrically about said axis of rotation;

said substantially disc-shaped spring further comprises at least one lug;

said spacer bolts and said clutch housing together comprise means for axially supporting said disc-shaped spring adjacent said outside diameter of said substantially disc-shaped spring;

at least two adjacent ones of said flexible tab elements of said membrane spring define an opening therebetween; and said at least one lug connects at least one of said flexible tab portions of said substantially disc-shaped spring with said opening;

said flexible tab elements of said membrane spring define elongated slots between adjacent ones of said flexible tab elements; and at least one of said slots having a widened portion to form said opening.

15. The friction clutch according to claim 14, wherein:

at least one of said substantially disc-shaped spring and said membrane spring are elastically and conically deformed upon said at least one lug connecting at least one of said flexible tab portions of said substantially disc-shaped spring with said opening; and said substantially disc-shaped spring and said membrane spring are permanently connected to one another.

16. The friction clutch according to claim 12, further comprising:

a plurality of spacer bolts disposed substantially concentrically about said axis of rotation;

said spacer bolts connecting said clutch housing and said membrane spring; and at least one separate connecting element holding at least one of said flexible tab portions of said disc-shaped spring in contact with said membrane spring.

17. The actuation system according to claim 16, wherein;

said actuation system comprises a release bearing;

said at least one separate connecting element comprises said release bearing;

said release bearing being disposed radially inward of said body member of said disc-shaped spring;

at least one of said flexible tab portions extending between said flexible tab elements of said membrane spring and said release bearing; and said at least one of said flexible tab portions is firmly held in axial contact with said flexible tab elements of said membrane spring by said release bearing.

18. The friction clutch according to claim 16, wherein said at least one separate connecting element comprises at least one rivet.

19. The friction clutch according to claim 16, wherein said at least one separate connecting element comprises a ring-shaped component engaged concentric to the axis of rotation with said flexible tab elements of said membrane spring.

20. The friction clutch according to claim 19, wherein:

at least two adjacent ones of said flexible tab elements of said membrane spring define an opening therebetween;

said tab portions have a first surface facing said membrane spring and a second surface facing away from said membrane spring;

said ring-shaped component comprises a body member;

said body member being disposed to contact said second surface;

said ring-shaped component comprises a plurality of arm portions extending axially within and beyond said openings;

said arms comprising an end portion extending axially beyond said membrane spring; and said end portion being one of: bent and hammered down, toward said first surface.

21. The friction clutch according to claim 19, wherein:

at least two adjacent ones of said flexible tab elements of said membrane spring define an opening therebetween;

said flexible tab portions each have a first surface facing said membrane spring and a second surface facing away from said membrane spring;

said flexible tab portions extend so as to one of: cover and overlap said openings in said membrane spring;

said ring-shaped component comprises a body member;

said body member comprises an axially flexible corrugated washer;

said flexible tab elements each have a surface facing toward said pressure plate;

said body member being disposed to contact said surfaces of said flexible tab elements facing toward said pressure plate;

said ring-shaped component further comprises a plurality of arm portions extending axially outward from said body member into and beyond said openings; and said arm portions comprise end portions which extends radially outward on said first surface of said flexible tab portions to surround one or more of said flexible tab portions in one of: said cover and overlap areas.

* * * * *

UNITED STATES PATENT AND TRADEMARK OFFICE
CERTIFICATE OF CORRECTION

PATENT NO. : 5,715,920
DATED : February 10, 1998
INVENTOR(S) : Joachim LINDNER, Günther ESLY, Michael WEISS, Heiko SCHULZ-ANDRES, Achim LINK, and Reinhold WEIDINGER It is certified that error appears in the above-identified patent and that said Letters Patent is hereby corrected as shown below:

In column 5, line 40, after 'tabs', delete "lib" and insert --11B--.

In column 6, line 29, after the second occurrence of 'tabs', delete "lib" and insert --11B--.

In column 9, line 23, after 'and', delete "2C." and insert --2D.--.

In column 9, line 33, after 'Inventors:', delete "john" and insert --John--.

In column 10, line 24, after 'Nos.', delete "P 195 8 055.0," and insert --P 195 18 055.0,--.

Signed and Sealed this

Twenty-third Day of June, 1998

*Attest:*

BRUCE LEHMAN

*Attesting Officer*  Commissioner of Patents and Trademarks